April 8, 1947.  A. G. ZIMMERMAN  2,418,545
PAD ROLLER ASSEMBLY
Filed May 26, 1944

ARTHUR G. ZIMMERMAN,
INVENTOR.

BY

ATTORNEY.

Patented Apr. 8, 1947

2,418,545

UNITED STATES PATENT OFFICE 2,418,545

PAD ROLLER ASSEMBLY

Arthur G. Zimmerman, Indianapolis, Ind., assignor to Radio Corporation of America, a corporation of Delaware Application May 26, 1944, Serial No. 537,454

8 Claims. (Cl. 271—2.3)

This invention relates to motion picture apparatus, and particularly to pad rollers for maintaining a film on a drive sprocket or roller.

In motion picture equipment, a film having picture images and/or sound images thereon is driven through various types of apparatus, such as picture projectors and sound reproducers, by means of sprockets having teeth on one or both ends thereof for engaging the film in its perforations longitudinally disposed near the edges of the film. As this film must be advanced at as constant and uniform a speed as possible, particularly past the translation points in the sound recording and reproducing units, it becomes essential that the film pass over the sprockets in a smooth and uniform manner. One of the factors which produces uniform film travel is the maintenance of the film on the sprockets at the proper position. It is, of course, usual in the art to use pad rollers for this purpose, the present invention being directed to an improved form of pad roller construction which provides flexibility and simplicity of operation.

The pad roller assembly of this invention includes two rollers, one of which is a fixed flanged roller spaced away from the sprocket, and the other of which is adjustable with respect to the film contact surface and held in its operative position by spring tension. Since the latter roller is immediately adjacent the sprocket, it is necessary that this roller be adjustable away from and toward the sprocket in order to thread the film on the sprocket. Another feature of the present pad roller assembly is the simplified arrangement for holding the roller in its inoperative position during the threading operation and for returning the roller to its operative position on a sprocket.

The principal object of the invention, therefore, is to facilitate the maintenance of a film in the proper position on a film driving sprocket or roller.

Another object of the invention is to provide an improved film pad roller assembly to facilitate threading of the film into the desired position on a sprocket.

A further object of the invention is to provide an improved pad roller assembly which may be easily adapted to hold a single film on two portions of a sprocket or two films on the same sprocket.

A still further object of the invention is to provide an improved pad roller assembly which is easily attachable and detachable from a film apparatus, and is easily adjustable to facilitate the threading of the film over the sprockets.

Although the novel features which are believed to be characteristic of this invention will be pointed out with particularity in the appended claims, the manner of its organization and the mode of its operation will be better understood by referring to the following description read in conjunction with the accompanying drawings forming a part hereof, in which:

Figure 1:
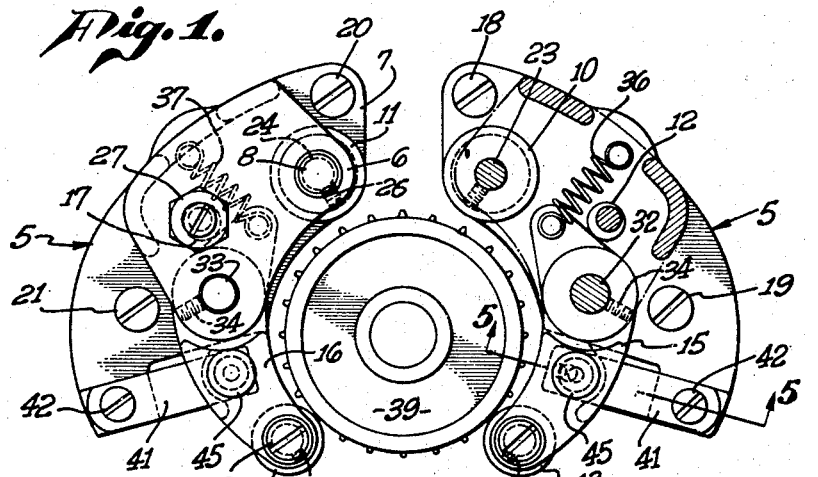
Fig. 1 is an elevational view partially in cross section, of right and left hand sprocket assemblies embodying the invention.

Referring now to the drawings in which the same numerals refer to like elements, each of the right and left-hand pad roller assemblies shown in Fig. 1 has a frame 5 which provides supports 6 and 7 for fixed flanged rollers 10 and 11, and a pivotal support for two pairs of arms 15 and 16 on which adjustable rollers 13 and 14 are mounted. The frames are U-shaped and have their back plates fastened to the walls of a picture projector, sound recorder, or reproducer by means of bolts 18, 19, 20, and 21.

Figure 3:
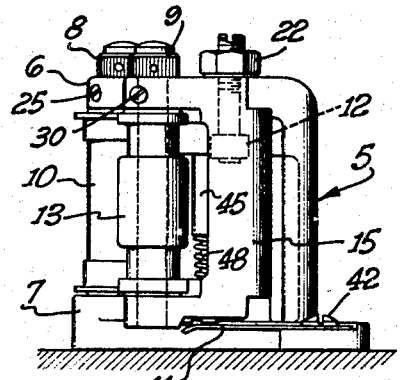
Fig. 3 is a bottom view of the right-hand assembly of Fig. 1 taken along the line 3—3 thereof.

The rollers 10 and 11 are adapted to rotate on partially hollow shafts 23 and 24, held in their supports by set screws 25 and 26, respectively. The lower rollers 13 and 14 are also mounted on similar shafts held by set screws, such as shown at 30 in Fig. 3. Knurled rings 8 and 9, rotatable on the ends of the shafts have holes therein to permit the introduction of oil into the hollow portion of the shafts for lubricating the rollers. The arms 15 and 16 are pivotally mounted on shafts 32 and 33 held in position by suitable set screws, such as shown at 34, the upper end of the arms 15 and 16 being connected to one end of tension springs 36 and 37, the other ends of the springs being attached to the outer portion of the frames. The rollers 13 and 14 on the other ends of arms 15 and 16 are adapted to be moved away from the sprocket 39 against the tension of the spring, and are maintained in operative position on the sprocket 39 by spring tension. To position the rollers 13 and 14 at the proper distance from the sprocket 39, the upper ends of arms 15 and 16 are stopped by cams 12 and 17 on respective threaded shanks, which may be rotated or adjusted from the front to vary the roller positions and then locked by nuts 22 and 27, respectively.

Figures 4, 5:
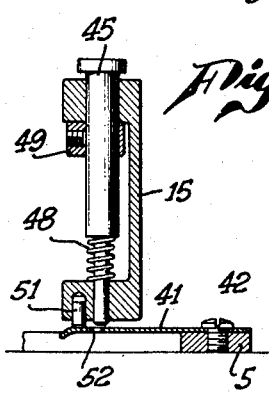
Fig. 4 is a detail view of the locking mechanism for holding the pad roller in threading position taken along the line 4—4 of Fig. 2.
Fig. 5 is a detail view similar to Fig. 4 showing the locking mechanism when the pad roller is in operative position, and taken along the line 5—5 of Fig. 1.

Also mounted on the frame 5, is a flat spring 41 held in position by a screw 42. On the arm 15, co-axially with the roller 13 is a push-pin 45. (See Figs. 4 and 5.) The pin 45 is adapted to be held in longitudinal position by the compression of a spring 48 acting against the larger diameter section of the pin 45 on which is mounted a stop collar 49 abutting the inner face of the front section of arm 15. Mounted in the back section of arm 15 is a fixed pin 51, the end of which is adapted to fit in a hole 52 of the spring 41 when the lower roller 13 is in inoperative or threading position away from the sprocket 39 as shown in Fig. 4. Pressure on the push-pin 45, however, will remove the pin 51 from the hole 52 by pushing the spring 41 below the pin 51 permitting the lower end of the arm 15 to move toward the sprocket under the tension of spring 36, pin 51 then being in the position shown in Fig. 5.

Figure 2:
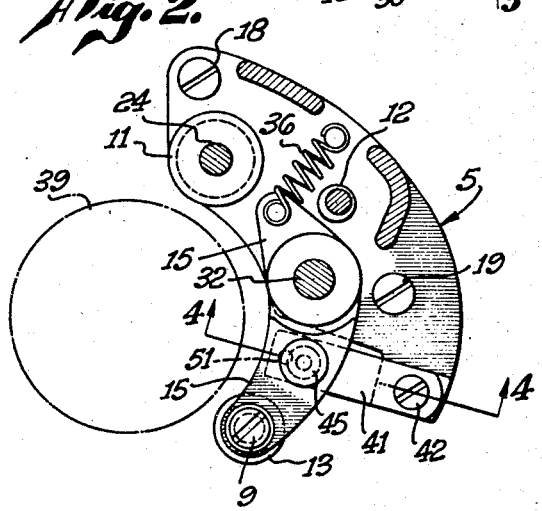
Fig. 2 is a view of one of the assemblies of Fig. 1 showing the roller in film threading position.

Thus, to adjust the pad rollers to threading position, it is only necessary to manually move the rollers 13 and 14 away from the sprocket to the positions where the pins 51 coincide with holes 52 in the springs 41. The arms 15 and 16 will now be locked in position. (See Fig. 2.) After the film is threaded on the sprocket, pressure on the pins 45 will release the arms and permit the springs 36 and 37 to move the rollers 13 and 14 to their operative positions as fixed by cams 12 and 17.

It will be noted that the rollers 10 and 11 are flanged guide rollers with the film riding on the roller at the edges thereof, while the rollers 13 and 14 are pressure rollers adapted to hold the film at the center. These particular forms of pad rollers are particularly suited to sound recorders wherein only a narrow sound track portion of the film is used.

I claim as my invention:

1. A pad roller construction for guiding film on and off of a sprocket, comprising a segmental U-shaped frame, shafts mounted on said frame, a roller on one of said shafts, an adjustable arm pivoted on another of said shafts, a shaft mounted on one end of said arm, a roller mounted on said last-mentioned shaft, resilient means attached to the other end of said arm to urge said other end of said arm away from said sprocket and said last mentioned roller on said first mentioned end of said arm toward said sprocket, a cam abutting said end of said arm being urged away from said sprocket for adjusting said arm to position said roller thereon with respect to said sprocket, and means for holding said arm to position said roller away from said sprocket.

2. A pad roller construction in accordance with claim 1 in which means are provided for releasing said arm from said last-mentioned position to permit said resilient means to move said first mentioned end of said arm having said roller mounted thereon toward said sprocket.

3. A pad roller assembly for a film sprocket comprising a segmental U-shaped frame, a rotatable roller mounted between the sides of said frame at one end thereof, a segmental arm pivoted on said frame near the central portion thereof, one end of said arm being resiliently urged away from said sprocket and the other end of said arm being simultaneously urged toward said sprocket, a second rotatable roller mounted on said last-mentioned end of said arm, cam means mounted on said frame and bearing against said first mentioned end of said arm for adjusting said second roller in position with respect to said sprocket, and positive locking means for holding said second roller away from said sprocket.

4. A pad roller assembly in accordance with claim 3 in which additional means are provided for releasing said positive locking means.

5. An adjustable pad roller construction for a film sprocket, comprising a U-shaped frame, an arm pivoted on said frame, resilient means attached to one end of said arm to urge the other end of said arm toward said sprocket, a rotatable roller on said last-mentioned end of said arm, a cam mounted for rotation on said frame and bearing against said first mentioned end of said arm for adjusting the position to which said resilient means can urge said roller, and means for maintaining said roller at a distance from said sprocket to permit threading film thereon.

6. An adjustable pad roller construction in accordance with claim 5 in which said adjusting means comprises an eccentric cam bolt mounted on said frame.

7. An adjustable pad roller construction in accordance with claim 5 in which said last-mentioned means includes a push-pin mounted on said arm with its axis parallel with the axis of said roller, a pin fixed on said arm, and a member on said frame having an aperture to accommodate said pin, said push-pin being adapted to remove said pin from said aperture.

8. An adjustable pad roller construction in accordance with claim 5 in which said last-mentioned means includes a fixed apertured member, a pin fixed on said arm for insertion in said aperture, and means for releasing said pin from said aperture by removing said member from said pin to permit said resilient member to return said roller to said sprocket.

ARTHUR G. ZIMMERMAN.

REFERENCES CITED

The following references are of record in the file of this patent:

UNITED STATES PATENTS

| Number | Name | Date |
|---|---|---|
| 2,059,342 | Haas | Nov. 3, 1936 |
| 2,073,224 | Ross | Mar. 9, 1937 |
| 1,963,562 | Shaw et al. | June 19, 1934 |
| 2,073,225 | Ross et al. | Mar. 9, 1937 |
| 2,144,210 | Vollenweider | Jan. 17, 1939 |
| 2,258,759 | Heacock | Oct. 14, 1941 |